United States Patent
Remke et al.

[11] Patent Number: 6,012,493
[45] Date of Patent: Jan. 11, 2000

[54] BONDED METAL-PLASTIC COMPOSITE STRUCTURES

[75] Inventors: Matthew S. Remke, Atlanta; Scott W. Ragland, Alpharetta; J. Bradley Pearce, Snellville, all of Ga.; Raymond E. Ragland, Union, Mo.; G. William Ragland, Dunwoody, Ga.

[73] Assignee: ATD Corporation, St. Louis, Mo.

[21] Appl. No.: 08/927,969

[22] Filed: Sep. 11, 1997

[51] Int. Cl.⁷ .............. B23P 15/26; F16L 11/04; F16D 1/00
[52] U.S. Cl. .............. 138/38; 138/140; 29/157.3 V
[58] Field of Search ............... 138/140, 38; 62/45.1; 29/157.3 V; 99/107, 339; 219/727, 440; 165/166; 426/113

[56] References Cited

U.S. PATENT DOCUMENTS

| | | | |
|---|---|---|---|
| Re. 33,912 | 5/1992 | Lapkowski | 165/166 |
| 3,046,174 | 7/1962 | Brooks et al. | |
| 3,322,610 | 5/1967 | Brooks et al. | 428/180 |
| 3,644,124 | 2/1972 | Bedsole | 99/107 |
| 3,886,290 | 5/1975 | Theimer et al. | 426/113 |
| 4,017,953 | 4/1977 | Creigton | 29/157.3 V |
| 4,164,605 | 8/1979 | Okawa et al. | 428/593 |
| 4,308,084 | 12/1981 | Ohtusuki et al. | 156/233 |
| 4,318,965 | 3/1982 | Blair | 428/594 |
| 4,641,005 | 2/1987 | Seiferth | 156/233 |
| 4,676,857 | 6/1987 | Scharr et al. | 156/233 |
| 4,918,927 | 4/1990 | Eigenbrod | 62/45.1 |
| 5,139,888 | 8/1992 | Selwood et al. | 428/594 |
| 5,189,945 | 3/1993 | Hennick | 99/339 |
| 5,385,790 | 1/1995 | Atkinson et al. | 428/593 |
| 5,520,223 | 5/1996 | Iorio et al. | 138/140 |
| 5,524,406 | 6/1996 | Ragland | 428/594 |
| 5,549,956 | 8/1996 | Handwerker | 428/73 |
| 5,695,673 | 12/1997 | Geissler | 219/727 |
| 5,767,487 | 6/1998 | Tippmann | 219/440 |

*Primary Examiner*—Andres Kashnikow
*Assistant Examiner*—Davis Hwu
*Attorney, Agent, or Firm*—Burns, Doane, Swecker & Mathis, LLP

[57] ABSTRACT

A multilayer metal sheet-polymer composite wherein the multilayer metal sheet side provides heat resistance and heat protection for the polymer side. The multilayer metal sheet component preferably comprises aluminum or stainless steel foils bonded to the polymeric component to form articles such as, conduits, panels, equipment housings and cooking devices.

29 Claims, 3 Drawing Sheets

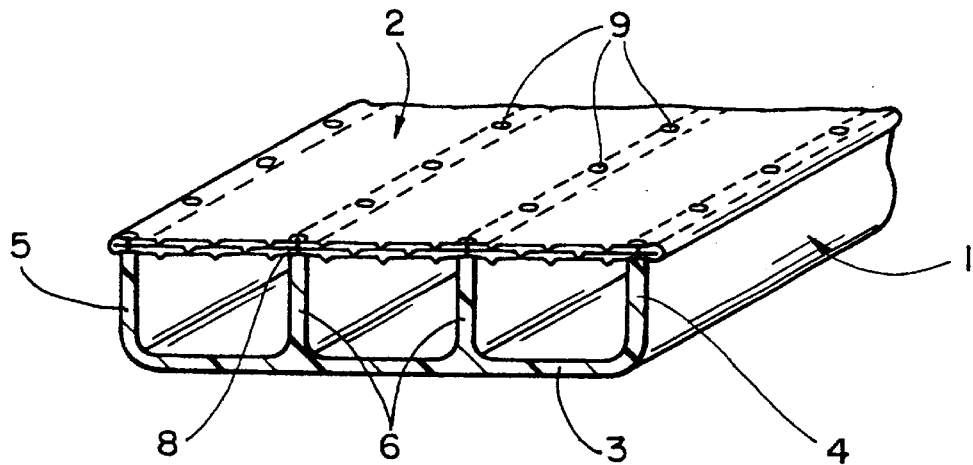
FIG_1
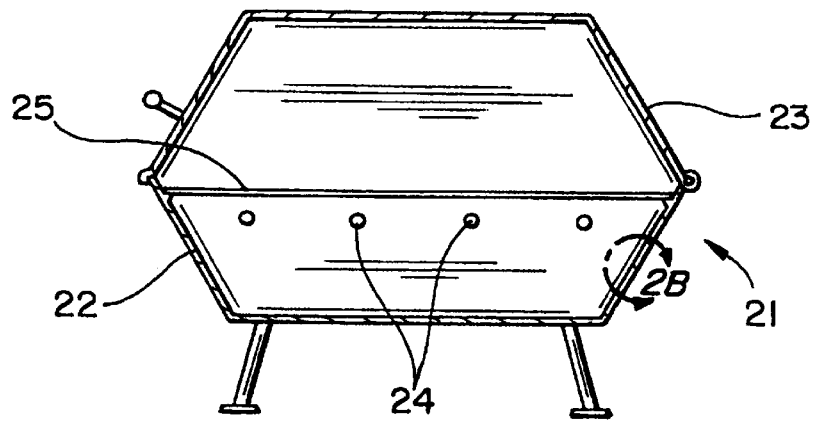
FIG_2A
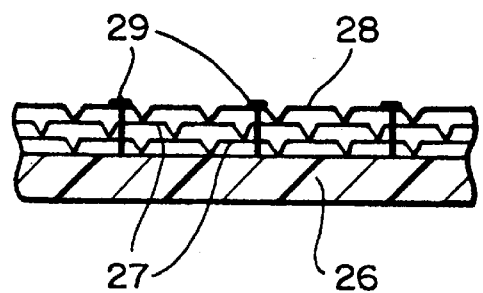
FIG_2B

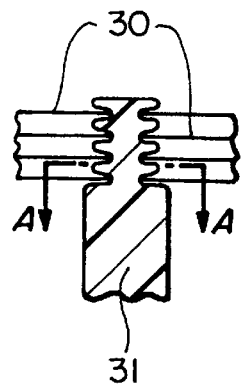
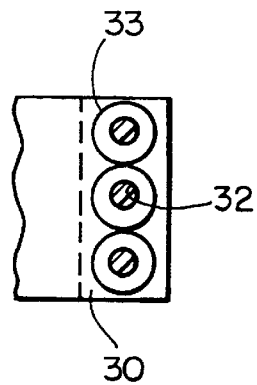
FIG_3A  FIG_3B
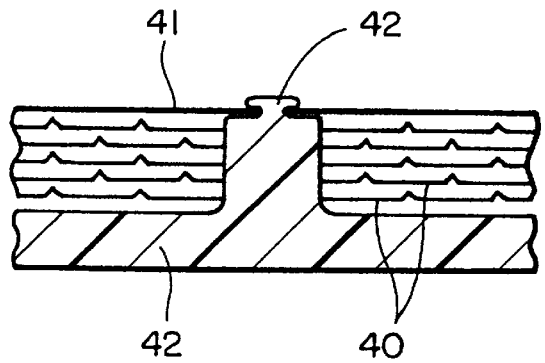
FIG_4
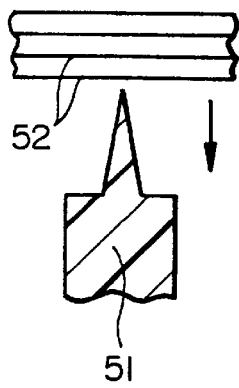
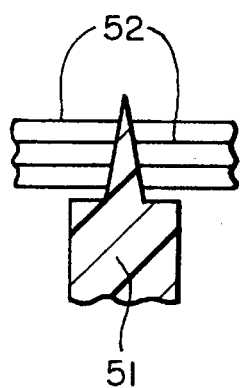
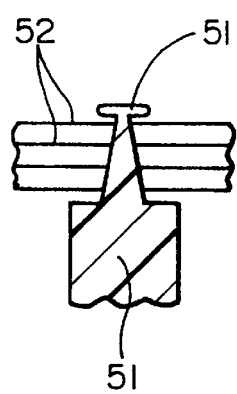
FIG_5A  FIG_5B  FIG_5C

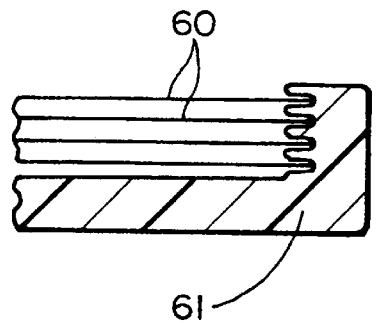
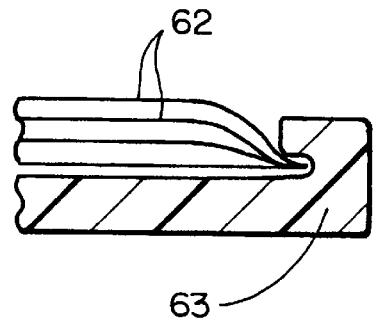
FIG_6A  FIG_6B
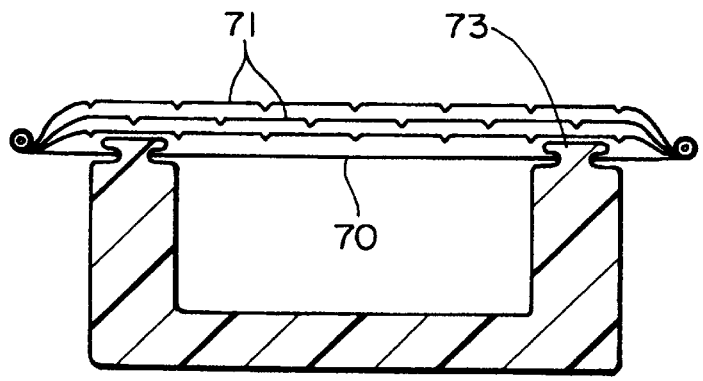
FIG_7
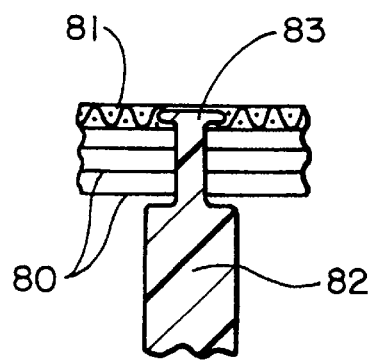
FIG_8

BONDED METAL-PLASTIC COMPOSITE STRUCTURES

FIELD OF THE INVENTION

This invention relates to the field of metal-plastic composite structures and methods of making same.

BACKGROUND OF THE INVENTION

Plastic and polymeric materials are used to make a wide variety of products for industrial use. For example, injection molded, sheet molded, and thermoformed parts are common in the automotive industry. In some instances it is desirable to use molded plastic or polymeric parts because of their ease and efficiency of making and the resultant low cost of manufacture. However, in some instances, plastic parts cannot be used when they must be positioned close to a heat source which may produce temperatures in excess of the service limits of the polymeric material practical for use in such part from an economic or processing standpoint. In such instances it is sometimes necessary to change to a higher performance polymer and consequently a more expensive polymer for such a part. If a polymeric part becomes impractical or uneconomical, a metal part is frequently used. Plastic parts must be made with certain thicknesses to provide sufficient structural strength for the given part. In many instances it is desirable to decrease the amount of plastic in a part to thereby decrease the weight of the part. The above considerations are of particular interest in the automotive industry for both cost savings and weight reduction of automobiles. Other industries and markets have similar interests.

Therefore it is an object of this invention to provide plastic and polymeric structures with increased heat resistance and/or reduced weight. Other objects of this invention will become apparent from the disclosure herein, particularly with respect to other commercial products in the various industries in which the products and methods of the present invention can be used.

SUMMARY OF THE INVENTION

This invention provides novel metal-polymeric articles and structures which can be composite type structures, co-molded type structures or other types of structures utilizing the invention disclosed herein. In this invention the metal part of the metal-polymeric structure comprises a multilayer stack of metal sheets, where it is preferred that at least some of the layers are metal foils. According to the teachings of the present invention the stack of metal sheets is attached to the polymeric portion of the structure in various ways as disclosed herein to form desired composite or co-molded articles, ranging from flat or shaped plastic or polymeric panels having the stack of metal sheets on one or both surfaces thereof, to complex injection molded or otherwise formed plastic or polymeric parts or components having the stack of metal sheets attached or bonded to some portion of the shaped polymeric article. If desired a multilayer stack of metal sheets can be positioned internally in a composite structure of this invention with a polymeric portion attached to both sides of the stack. These composite articles formed according to the present invention can be designed by one skilled in the art following the disclosure herein to achieve certain objectives of improved heat resistance, reduced weight and other objectives which will be apparent to one skilled in the art following the disclosure set forth herein.

In one aspect, this invention provides a conduit for a heating or cooling fluid comprising a first wall portion comprising a stack of metal sheets, an opposing wall portion comprising a polymeric material, and an attachment area joining the first wall portion and the opposing wall portion where a portion of at least one of the metal sheets in the stack is bonded to the polymeric material. In this aspect of the invention a portion of the bonded metal layer is preferably embedded in the polymeric material to secure the stack of metal sheets to the plastic or polymeric portion of the conduit. It is also preferred that at least some of the metal sheets in the stack are metal foils, preferably having spacers, such as embossments of the layers, to provide gaps between the metal sheet layers.

In another aspect, this invention provides a method of making a conduit for a heating or cooling fluid comprising forming a stack of metal sheets into a shape providing a first wall portion of the conduit, forming a polymeric material into a shape providing an opposing wall of the conduit, and joining the first wall portion and the second opposing wall portion together by bonding a portion of at least one of said metal sheets to the polymeric material, preferably by embedding a portion of at least one metal sheet in its polymeric material. As indicated above, a preferred aspect of this method of the invention includes using metal foils as one or more of the metal sheets, because metal foils provide, among other advantages, economy, ease of forming and superior heat resistance and management when used in multiple, spaced apart layers. Using a multilayer stack of metal foils in the method of this invention provides advantageous options for bonding of the metal foils and the polymeric layer or material as set forth in the description of this invention.

In another aspect this invention provides a cooking device comprising a heat source, and a housing proximate the heat source, said housing at least in part comprising a stack of metal sheets forming the surface of the housing facing the heat source and a polymeric material forming the opposite surface of the housing facing away from the heat source, wherein the stack of metal sheets is attached to the polymeric material by at least one of said metal sheets being bonded to the polymeric material. In this aspect of the invention the housing may comprise a flat panel, such as an oven wall, or may comprise a shaped housing, such as for a gas, electric or other outdoor barbecue grill or smoker. The multilayer metal sheet structure may comprise flat or smooth metal sheet layers, or preferably may be provided with spacers to form gaps between the layers to provide more effective heat protection for the polymeric panel or housing. The multilayer stack of metal sheets provides heat protection for the polymeric portion through reflection, insulation, spreading, dissipation and other manners of management of heat, thereby enabling use of certain polymeric and plastic materials in such panels and housings where it has heretofore been impractical or impossible to use such polymeric or plastic parts. In this aspect of the invention the housings referred to may be comprised of individual panels assembled to form a housing or may be other configurations, which comprise a single shaped or molded member forming an entire housing part.

In another aspect this invention provides a method of making a food cooking device comprising providing a housing for a support for a heat source and proximate thereto a support for food to be cooked thereon, shaping a stack of metal sheets adapted to form at least a portion of the surface of the housing facing the heat source or the food support, shaping a polymeric material adapted to form the opposite surface of the housing facing away from the heat source or food support, and joining the stack of metal sheets and the polymeric material by bonding a portion of at least one of said metal sheets to the polymeric material. As indicated above with respect to the method of forming a conduit, it is likewise preferred in this aspect of the invention to use metal foils as part or all of the metal sheets in the stack, because metal foils provide economy and ease of forming. Using a multilayer stack of metal foils in the method of this invention provides advantageous options for bonding of the metal foils and the polymeric layer or material together as set forth in the description of this invention.

In addition to the above particular embodiments of the present invention, this invention provides in its general aspect a composite metal-polymeric article comprising a stack of metal sheets, a polymeric layer, and an attachment area where the stack is attached to the polymeric layer by at least one of the metal sheets being bonded to the polymeric layer. In this connection the general aspect of the present invention also provides a method of making a composite metal-polymeric article comprising forming a stack of metal sheets, forming a polymeric layer, and attaching the stack to the polymeric layer by bonding at least one of the metal sheets of the stack to the polymeric layer. Following these general aspects of the present invention along with the particular disclosures set forth herein with respect to the preferred details and optional designs will enable one skilled in the art to utilize the present invention in any desired field of use to provide articles and products to fulfill particular needs utilizing the inventions set forth herein, which articles and products range from panels to hollow structures to complex parts.

BRIEF DESCRIPTION OF THE DRAWINGS

FIG. 1 is a perspective view of a portion of a multi-channel conduit made according to the present invention.

FIG. 2A is a cross-section view of a cooking device illustrating the employment of a multilayer metal sheet-polymeric composite according to the present invention.

FIG. 2B is a detailed view of the wall section of the housing of the cooking device in FIG. 2A.

FIG. 3A is a cross-section illustration of the polymer flow through openings in the metal sheet layers to embed portions of the layers in the polymer thereby locking the polymer and the multilayer metal sheet structure together.

FIG. 3B is a top view of the same structure illustrating that the openings and spacings of the openings in the metal sheets can be designed such that the flow through of polymer will spread between the layers and on top of the top layer to form a seal along the line of the openings and the metal sheets by the polymer flowing from one opening to contact the polymer flowing from the next opening in the metal sheets.

FIG. 4 illustrates an alternative structure for attaching the multilayer metal sheets to the polymer portion of the structure.

FIGS. 5A, 5B, and 5C illustrate a method and structure for attaching the multilayer metal sheets to the polymer portion of the structure wherein a protruding portion of the polymer is configured to pierce and pass through the metal sheets, then the tip of the polymer protrusion portion, which pierced the sheets, is deformed to hold the stack of metal sheets on the polymer structure.

FIGS. 6A and 6B illustrate the attachment of the multilayer stack of metal sheets to the polymer material by embedding the edges or ends of sheets in the polymer material.

FIG. 7 illustrates an embodiment of this invention wherein the first sheet of the stack of metal sheets is bonded to the polymeric structure and remaining sheets of the stack of metal sheets are mechanically attached to the first sheet.

FIG. 8 illustrates an example of this invention where the top sheet of the stack of metal sheets is a metal mesh sheet or layer or expanded metal sheet or layer into which the polymer is impregnated to form the attachment of the stack of sheets to the polymer member.

DESCRIPTION OF THE INVENTION

The present invention can be understood in reference to the following embodiments of this invention as well as the following general description of various aspect of this invention. In the first example and embodiment of the present invention reference is made to FIG. 1 which illustrates a multi-channel conduit constructed according to this invention. The example conduit illustrated in FIG. 1 comprises an injection molded or sheet molded polymeric portion (1) in which the bottom (3), sides (4), (5), and interior walls (6) are conventional thickness for an automotive heating and air-conditioning duct. The top portion (2) comprises three layers of aluminum foil wherein the two bottom layers are 2 mil aluminum and the top exterior layer is a 10 mil aluminum sheet. Each of the aluminum layers is embossed with appropriate embossments to provide spacing and air gap between the metal foil layers. The metal layers have been provided with a series of holes through all the layers where the holes are aligned vertically from layer to layer and aligned longitudinally to correspond with the top edges of the exterior (4), (5), and interior (6) vertical walls of the polymeric portion (1). When the stack of embossed metal layers is mated with and applied to the plastic portion (1) of the part, appropriate thermoforming heat and pressure is applied to cause the portion of the plastic contacting the stack of metal foils to flow into and through the holes or openings in the metal foil layers (at 8) until a portion of the plastic (9) is expelled from the openings on the top layer of the metal foil where it spreads slightly then is allowed to cool and solidify. The resin flow-through of the openings in the layers of the stack of metal sheets embeds portions of the metal sheets in the plastic and provides a permanent structural bond in the stack of metal sheets with the plastic portion of the conduit. FIG. 3A and FIG. 3B, described below, illustrate how the bonding of the metal foil sheets to the plastic member is structured in this particular embodiment of the invention. As will be recognized by one skilled in the art this example utilizes a thermoplastic resin part which can be thermoformed upon application of the stack of metal foils to the preformed plastic part. Other methods and materials may be used to accomplish the manufacture of this and similar structures, such as the use of injection molding wherein a multilayer metal sheet/metal foil preform is placed into an appropriate mold and the plastic part injection molded against the stack of metal sheets and foils, in which operation the liquid resin will flow through openings in the sheets of the stack of metal foils thereby embedding selected portions of the sheets in the polymeric material and interlocking the metal sheets with the plastic part at the same time that the plastic portion of the part is formed. Parts such as composites illustrated in FIG. 1 can be utilized in environments which can be unsuitable for a plastic part. For example, the multilayer metal side of the conduit of FIG. 1 can act as a heat shield to protect the multi-channel conduit from the damaging effect of a nearby heat source, such as an exhaust pipe in an automotive application. The multichannel composite conduit example illustrated in FIG. 1 also has the advantage of being lighter in weight than an all-plastic part of the same configuration.

In another embodiment illustrating the present invention, reference is made to FIG. 2A which illustrates an outdoor electric grill (21) comprising a lower housing (22) and an upper housing (23) containing electric heating elements (24) and support (25) for cooking food. Conventional grills of this type are typically single layer metal housing structures. The composite multilayer metal-polymer structure of the present invention provides a composite structure which enables the use of plastic material to form the major structural component of housing sections (22) and (23) for the electric grill, while providing sufficient heat resistance to avoid degradation or damage to the plastic housing. FIG. 2B is a detail view of a portion of the cross-section of housing (22) illustrating the composite structure of this invention comprising the stack of metal foils bonded to the polymeric material forming the housing. In this embodiment, the stack of metal sheets comprise two layers of embossed 2 mil aluminum foil layers (27) with a top sheet of 10 mil aluminum (28). The metal layers are bonded to polymeric portion (26) by the polymer being molded through the metal layers (at 29) to interlock the metal layers to the polymeric portion (26). These drawings are not proportional or to scale, but are for illustration only. In practice, a compression molded composite according to this invention will be more compressed in configuration than illustrated here. This combination of metal sheets provides the reflective and heat dissipating qualities of the multilayer embossed aluminum foil heat shield pad, which is a preferred embodiment in the present invention for enabling the polymer housing structure to withstand the heat produced by the electric heating element (24). The 10 mil aluminum smooth or embossed sheet provides a heavier protective sheet for durability and for protecting the inner 2 mil sheets from corrosion or mechanical damage during normal usage of the grill. In preferred embodiments the stack can include three 2 mil aluminum foil layers with a top sheet which is a 10 mil aluminum smooth or embossed sheet or is a 3 mil stainless steel smooth or embossed foil for better corrosion resistance. The polymeric member forming the exterior of the housing can be any desired reasonably heat resistant polymer or polymeric composition, including polymer compositions loaded with chopped fiberglass for reinforcement and/or calcium carbonate or other fillers for heat resistance. Various polymer compositions desired for various uses of the embodiment will be apparent to one skilled in the art, and from the disclosure herein.

The composite of the stack of metal sheets and the polymer material can be formed by molding and forming the component parts together in an appropriate mold. For example, the stack of four 2 mil aluminum foils and the 30 mil aluminum top sheet can be preassembled and shaped to fit in a desired mold. The sheets are preformed with embossments for spacing and with through holes for receiving the polymer flow during molding. The polymer material can be injection molded or can be in the form a sheet molding composition or a thermosetting prepreg fiber sheet. The stack of metal sheets and the polymeric sheet molding material can be placed in a pressure mold and molded together during which time the polymer is flowed to enable the polymer to flow through the openings or through holes in the metal sheets to embed portions of the sheet in the polymer structure. This provides the bonding of the stack of metal sheets to each other and to the polymer material. The resulting molded composite metal-polymer part then forms the housing for the cooking device as illustrated.

As is apparent from the above embodiment illustrating the present invention, the two essential structural components of the composite metalpolymeric articles of the present invention are the stack of metal sheets and the attached polymer structure. As is equally apparent, the other important aspect of the present invention is the configurations in which the stack of metal sheets are bonded to or interlocked with the polymer structure as well as the methods for achieving such bonding and/or interlocking.

The stack of metal sheets employed in this invention can be constructed of any desired metal in any thickness and texture desired by one skilled in the art for a particular application of the articles and devices according to this invention. In many applications two metal sheets will be adequate, but it is generally preferred to use at least three and preferably four to nine layers of metal sheets to achieve the heat shielding, strength or other properties desired for the composite structures of this invention. The metal sheets can be aluminum, stainless steel, copper, tin, lead, iron, chromium or other desired metal, alloy, lamininates, bimetals, and the like. Each sheet in the stack can typically range from a metal foil having a thickness of 0.8 mil up to 6 mils or can be metal sheets having a thickness from 6 mils to 30 or 50 mils or thicker depending on the final properties desired and the end use application dictating the in-use service requirements for the stack of metal sheets and in particular the exterior sheet exposed directly to the environment. Some typical examples of layers used as the stack of metal sheets in this invention are: (in mils, 1 mil=0.001 in.) 10/2/2/2/5; 5/2/2/2/2/5; 8/2/2/2/4/4/8; 30/4/4/2/2/5; 10/2/2/10; 5/2/2; 5/2; 10/2; 10/2/5; and 10/2/0.8/0.8/5.

Each sheet can be selected to have the configuration, texture or other properties desired for a particular application. In many applications it is preferred that the sheets, or at least one of the sheets, be embossed to provide spacing and air gaps between the layers. In other applications the sheets may be desired to be smooth and flat with as little space between the layers as possible. In some applications one or more of the metal sheets may be expanded metal sheets or sheets of metal mesh, which provide specific desired properties and characteristics when bonded to the polymeric portions. In other instances separate spacers or separators may be used between the layers such as metal pieces, embossments, ceramic powder, fiber materials, and the like. For example, the multilayer structures of U.S. Pat. No. 5,658,634, the disclosure of which is incorporated herein by reference, may be used in the structure of this invention, particularly where the temperature service limit is moderate. Or the multilayer stack metal sheets can include other desired elements, such as a heater as disclosed in U.S. Pat. No. 5,408,071, the disclosure of which is incorporated herein by reference.

In some instances it may be desired to use the multilayer metal foil structures disclosed in U.S. Pat. No. 5,011,743, the disclosure of which is incorporated herein by reference, as the multilayer metal sheet component. In other applications it may be desirable to form a shaped and rigid multilayer metal sheet structure to provide structural strength for the composite structure of this invention after the polymer material is attached and bonded to the multilayer metal sheet structure. For example, a multilayer metal sheet structure which is shaped and rigid and provides distinct structural strength is illustrated in co-pending U.S. application Ser. No. 08/871,275 filed Jun. 9, 1997, the disclosure of which is incorporated herein by reference. In other end use applications of the composite structures of this invention it may be desirable for the multilayer metal sheet component to have flexible characteristics, particularly where the polymeric component is a flexible or pliant material. Such a flexible multilayer metal sheet structure is illustrated and disclosed in co-pending U.S. application Ser. No. 08/871,771 filed Jun. 9, 1997, now U.S. Pat. No. 5,939,212 the disclosure of which is incorporated herein by reference. Such flexible multilayer metal sheet articles may be particularly useful in molding operations used in making the composite of the articles according to the present invention. In various end use applications and embodiments of the composite of the present invention, it will be apparent that the contact of metal sheet layers with each other can range from substantial portions, such as flat contact, to only point contact, such as point contact provided by point embossments. Where desired the metal sheets may have no contact with each other, by having separate spacers to hold the sheets apart in order to provide the thermal, acoustic and structural properties desired in a particular application. It is desired to provide space between the metal layers for desired polymer flow for therein bonding the components of the composite together.

The polymeric or plastic portion of the structure of this invention can be either a thermosetting polymer or a thermoplastic polymer, such as epoxy, polyester, polyurethane, polyethylene, polypropylene, polycarbonate or other type of polymer or engineering plastic selected by one skilled in the art for a particular embodiment or end use application of the final composite provided by this invention. The polymeric material can be injection molded, reaction injection molded, sheet molded, vacuum formed, blow molded or cast molded as desired for a particular embodiment or end use application. Similarly, the end product polymer portion of the composite of this invention can be rigid, semi-rigid, or flexible in nature depending on the characteristic of the stack of metal sheets employed with the polymer component and the end properties desired for the composite article of this invention. Typically the thermoset, thermoplastic, sheet molding, bulk molding and cast polymers and compounds useful in the composite of this invention will provide rigid structures of varying strengths from which one skilled in the art can select the desired properties. Other polymer materials such as RTV composition and rubber polymeric compositions can provide soft or flexible polymeric components for combination with the stack of metal sheets according to this invention. The resin forming the polymeric component of the present invention can be neat, filled with a particulate filler, such as calcium carbonate or other material for flame proofing or structural properties, and/or can contain fiber reinforcements in the form of fiber mats, including a prepreg heat and pressure curable mat, or in the form of chopped fibers contained in a liquid resin or in a spray-up composition. The selection of the appropriate polymer component for use with the appropriate stack of metal sheets can be accomplished by one skilled in the art following the above examples and the disclosure herein.

Preferred resins for many applications of the structures of this invention are thermoplastic resins due to their ease of molding, working and bonding to the stack of metal sheets. Thermoset resins are usually preferred for strength and high temperature properties. Particularly preferred resins include thermoset polyesters, such as resins sold under the trademark "NU-STONE," which are particularly preferred in the above cooking device embodiment of this invention, and vinyl ester molding compounds, such as resins sold under the trademark "POLYCOR," both available from Industrial Dielectrics, Inc. (known as "IDI"), Noblesville, Ind. Other preferred resins include the polycarbonate resins, such as resins sold under the trademark "LEXAN," available from General Electric, Polymer Dept., Schenectady, N.Y. In general, one skilled in the art can select polymers and resins from the generally known classes of high strength polyesters, epoxies, phenolics, melamines, and other polymers known for use in sheet molding compounds, bulk molding compounds, engineering thermoplastics molding operations, which selection will be based on economics as well as polymer processing and end use requirements.

Various methods may be used to attach the stack of metal sheets to the polymeric portion of the structure of this invention. In FIGS. 3A and 3B a preferred method of embedding a portion of the metal sheets (30) in the polymeric portion (31) is illustrated. Sheets (30) have openings, such as holes or slits, which allow resin (31) to flow during molding through the holes in small portions and extend in small amounts between the layers of metal sheets and through the hole in the exterior layer to spread on the outside of the last layer. This method of attaching the stack of metal sheets to the polymeric component provides interlocking of all the metal layers together and with the polymeric component. FIG. 3B is a sectional top view (AA) which illustrates that the openings (32) in the sheets can be sized and spaced so that the polymer flow through the holes and into the space between the sheets can be such that the polymer (33) will flow together in the space between the layers to form a continuous seal along the line of the openings in the sheets. This method of attaching the stack of metal sheets to the polymer component is a preferred method of forming the conduit type of structure illustrated in FIG. 1.

It will be recognized by those skilled in the art that, when desired for a particular composite design according to this invention, the stack of metal sheets can be attached together into a unitary unit so that the metal sheets are fastened or attached to each other without the necessity of any portion of the polymeric material embedding or encapsulating the sheet component into the polymeric component. In such an embodiment the stack of metal sheets can be constructed and the polymeric component can be formulated such that the exterior sheet of the stack of metal sheets can be bonded to the polymeric component by adhesive forces, such as a hot melt adhesive type of attachment, without the necessity of the polymer penetrating or encapsulating any openings or sheets in the stack of metal sheets. However, it is usually preferred for structural strength of the composite that the polymer embed at least some portion of at least one metal sheet of the stack.

FIG. 4 illustrates another embodiment for the attachment and bonding of the stack of metal sheets to the polymeric structure according to this invention. In this embodiment the stack of metal sheets contains one layer (41) which can be attached to the polymeric component. The remaining sheets (40) are contained in a cavity created between the polymeric component (42) and the exterior sheet (41).

FIGS. 5A, 5B, and 5C illustrate another method of attaching the stack of metal sheets to the polymeric component. In this embodiment a portion of the polymeric component (51) is formed in a sharp protrusion capable of penetrating the stack of metal sheets (52). This embodiment is particularly useful with thin metal foil layers, such as 1 mil or 2 mil foils, which are easily penetrated by the polymeric spike. As shown in FIG. 5B the polymeric structure can penetrate all of the layers in the stack of metal sheets then, as shown in FIG. 5C, the tip or end of the polymeric structure can be formed such as by melting or application of heat to lock the stack of metal sheets together with the polymeric component. It is recognized that in these illustrations the polymeric component can be any desired shape from a ridge or edge of a shape to a flat panel or shaped panel against which the entire stack of metal layers is molded. The openings for the polymer material to penetrate the metal layers can be designed at the edges, the interior or other locations desired in a particular composite of this invention.

FIGS. 6A and 6B illustrate another embodiment of attaching the stack of metal sheets to the polymeric component. In FIG. 6A metal sheets (60) have the edges or ends of the metal sheets embedded in polymeric components (61). This kind of arrangement can be achieved by injection molding or thermoforming. Similarly in FIG. 6B a similar edge encapsulation is accomplished but the metal sheet layers (62) are compressed at the edge so that the resin (63) is formed around and embeds the compressed edge of the sheets in the resin component. Such a compressed edge can also be shaped to a desired configuration for more elaborate encapsulation by the polymer.

FIG. 7 illustrates another embodiment for attaching the stack of metal sheets to the resin component according to this invention. In this embodiment the bottom sheet (70) of the stack of metal sheets is attached to the resin component (72) similar to that shown in FIGS. 3, 4 and 5. However, in this embodiment, the additional layers of metal sheets (71) are mechanically attached and crimped to the first metal sheet (70) to form a unitary structure according to the present invention. In this embodiment the exterior sheet (71) can provide thermal protection and shielding from a heat source so that the polymeric component including the attachment points (73) are shielded from the heat source.

FIG. 8 illustrates another embodiment according to the present invention wherein the top sheet (81) is a metal mesh layer and interior sheets (80) are smooth or embossed metal sheets as disclosed herein. In this embodiment the polymer (82) is allowed to flow through the inner layers (80) and into at least a portion of the outer mesh layer (81). In this configuration the polymer can lock all of the layers together and bond the stack to the polymeric component even though the polymer only penetrates a portion of the thickness of the mesh sheet and does not extend to the top or exterior of the mesh sheet. In this embodiment the exterior of the mesh sheet can protect the polymer bonding point (83) from excess heat similar to that achieved in the embodiment illustrated in FIG. 7.

Other embodiments and configurations of stacks of metal sheets in combination with polymeric layers and components according to the present invention will be apparent to one skilled in the art. Selection of materials and the various configurations according to the above teachings are within the scope of this invention as set forth in the following claims.

We claim:

1. A conduit for heating or cooling fluid comprising:
   a first wall portion comprising a stack of metal sheets;
   an opposing wall portion comprising a polymeric material; and
   an attachment area joining the first wall portion and the opposing wall portion where a portion of at least one metal sheet is bonded to the polymeric; wherein a portion of the bonded metal sheet is embedded in the polymeric material.

2. A conduit according to claim 1 wherein the stack of metal sheets comprise metal foils and the stack comprises spacers to provide gaps between a portion of the metal sheet layers.

3. A conduit according to claim 2 wherein the stack of metal foils comprises at least two layers of aluminum foil and at least one of said layers comprises embossments to provide gaps between the layers.

4. A conduit according to claim 2 wherein the opposing wall polymeric material forms a plurality of channels having ridges between the channels and the metal foils are bonded to each ridge between the channels to provide a multi-channel conduit.

5. A method of making a conduit for a heating or cooling fluid comprising:
   forming a stack of metal sheets into a shape providing a first wall portion of the conduit;
   forming a polymeric material into a shape providing an opposing wall of the conduit; and
   joining the first wall portion and the second wall portion together by bonding a portion of at least one of said metal sheets to the polymeric material; wherein the bonding comprises embedding a portion of the metal sheet in the polymeric material.

6. A method according to claim 5 comprising providing spacers in the stack to provide gaps between the metal sheets.

7. A method according to claim 5 comprising providing spacers in the stack to provide gaps between the metal sheets.

8. A method according to claim 6 comprising embossing at least one of said metal sheets to provide gaps between the metal sheets.

9. A method according to claim 7 comprising embossing at least one of said metal sheets to provide gaps between the metal sheets.

10. A cooking device comprising:
    a heat source; and
    a housing proximate the heat source, said housing at least in part comprising a stack of metal sheets forming the surface of the housing facing the heat source and a polymeric material forming the opposite surface of the housing facing away from the heat source, wherein the stack of metal sheets is attached to the polymeric material by at least one of said metal sheets being bonded to the polymeric material; wherein a portion of the metal sheet bonded to the polymeric material is embedded in the polymeric material.

11. A cooking device according to claim 10 wherein a portion of each metal sheet in the stack is embedded in the polymeric material.

12. A cooking device according to claim 10 wherein the stack of metal sheets comprise metal foils and the stack comprises spacers to provide gaps between a portion of the metal sheet layers.

13. A cooking device according to claim 12 wherein the stack of metal foils comprises at least two layers of aluminum foil and at least one of said layers comprises embossments to provide gaps between the layers.

14. A method of making a food cooking device comprising:
    providing a housing for a support for a heat source and proximate thereto a support for food to be cooked therein;
    shaping a stack of metal sheets adapted to form at least a portion of the surface of the housing facing the heat source or the food support;
    shaping a polymeric material adapted to form the opposite surface of the housing facing away from the heat source or food support; and
    joining the stack of metal sheets and the polymeric material by bonding a portion of at least one of said metal sheets to the polymeric material; wherein the bonding comprises embedding a portion of the metal sheet in the polymeric material.

15. A method according to claim 14 comprising including spacers in the stack to provide gaps between the metal sheets.

16. A method according to claim 14 comprising including spacers in the stack to provide gaps between the metal sheets.

17. A method according to claim 15 comprising embossing at least one metal sheet to provide gaps between the metal sheets.

18. A method according to claim 16 comprising embossing at least one metal sheet to provide gaps between the metal sheets.

19. A composite article having a metal-polymeric wall portion comprising:
   a stack of metal sheets on one side of the wall portion;
   a polymeric layer on the opposite side of the wall portion; and
   an attachment area where the stack of metal sheets is attached to the polymeric layer by at least one of the metal sheets being bonded to the polymeric layer; wherein a portion of the metal sheet bonded to the polymeric layer is embedded in the polymeric layer.

20. A composite metal-polymeric article according to claim 19 wherein the stack metal sheets comprise metal foils and the stack comprises spacers to provide gaps between a portion of the metal foils.

21. A composite metal-polymeric article according to claim 20 wherein the stack of metal foils comprises at least two layers of aluminum foil and at least one of said layers comprises embossments to provide gaps between the layers.

22. A method of making a composite article having a metal-polymeric wall portion comprising:
   forming a stack of metal sheets;
   forming a polymeric layer; and
   attaching the stack of metal sheets to the polymeric layer by bonding at least one of the metal sheets of the stack to the polymeric layer to form the wall portion having the stack of metal sheets on one side of the wall portion and the polymeric layer on the other side of the wall portion; wherein the bonding comprises embedding a portion of the metal sheet in the polymeric layer.

23. A method according to claim 22 comprising attaching the stack to the polymeric layer by:
   forming a portion of the polymeric layer in a shape adapted for piercing the metal layers;
   piercing said polymer shape through the metal layers to expose a tip of the polymer shape on the other side of the metal layers; and
   deforming the exposed tip of the polymer shape to prevent removal of the polymer shape from the metal layers.

24. A method according to claim 22 comprising including spacers in the stack to provide gaps between the metal sheets.

25. A method according to claim 22 comprising including spacers in the stack to provide gaps between the metal sheets.

26. A method according to claim 23 comprising including spacers in the stack to provide gaps between the metal sheets.

27. A method according to claim 24 comprising embossing at least one metal sheet to provide gaps between the metal sheets.

28. A method according to claim 25 comprising embossing at least one metal sheet to provide gaps between the metal sheets.

29. A method according to claim 26 comprising embossing at least one metal sheet to provide gaps between the metal sheets.

* * * * *